US012775965B2

(12) United States Patent
Letayf et al.

(10) Patent No.: US 12,775,965 B2
(45) Date of Patent: Oct. 27, 2026

(54) SYSTEMS AND METHODS FOR IMPROVED VEHICLE TRANSACTION PLATFORMS

(71) Applicant: Cox Automotive, Inc., Atlanta, GA (US)

(72) Inventors: Mazen Letayf, Atlanta, GA (US); John Faircloth, Atlanta, GA (US); Rahul Gupta, Atlanta, GA (US)

(73) Assignee: Cox Automotive, Inc., Atlanta, GA (US)

( * ) Notice: Subject to any disclaimer, the term of this patent is extended or adjusted under 35 U.S.C. 154(b) by 79 days.

(21) Appl. No.: 17/129,497

(22) Filed: Dec. 21, 2020

(65) Prior Publication Data

US 2022/0156808 A1 May 19, 2022

Related U.S. Application Data

(60) Provisional application No. 63/115,967, filed on Nov. 19, 2020.

(51) Int. Cl.

*G06Q 30/0283* (2023.01)
*G06Q 40/03* (2023.01)
*G06Q 10/087* (2023.01)

(52) U.S. Cl.

CPC ......... *G06Q 30/0283* (2013.01); *G06Q 40/03* (2023.01); *G06Q 10/087* (2013.01)

(58) Field of Classification Search

CPC ............. G06Q 30/02011; G06Q 40/03; G06Q 30/0631; G06Q 30/0611; G06Q 30/0255; G06Q 30/0269

See application file for complete search history.

(56) References Cited

U.S. PATENT DOCUMENTS

| | | | | |
|---|---|---|---|---|
| 9,466,079 | B2 * | 10/2016 | Hygema ............ | G06Q 30/0631 |
| 10,810,656 | B1 * | 10/2020 | McCroskey ....... | G06Q 30/0641 |

(Continued)

FOREIGN PATENT DOCUMENTS

| | | | |
|---|---|---|---|
| KR | 10-2006-0085765 | A | 7/2006 |
| KR | 10-2010-0000080 | A | 1/2010 |
| KR | 10-2017-0114136 | A | 10/2017 |

OTHER PUBLICATIONS

T. Giannakas, P. Sermpezis and T. Spyropoulos, "Show me the Cache: Optimizing Cache-Friendly Recommendations for Sequential Content Access," 2018 IEEE 19th International Symposium, pp. 14-22, doi: 10.1109/WoWMoM.201 (Year: 2018).*

(Continued)

*Primary Examiner* — Rutao Wu
*Assistant Examiner* — Letoria G Knight
(74) *Attorney, Agent, or Firm* — Eversheds Sutherland (US) LLP

(57) ABSTRACT

The present disclosure relates to systems and method for improved vehicle transaction platforms. An example method may include receiving, by a vehicle transaction platform comprising an inventory of vehicles for purchase and from a device associated with a first user accessing the vehicle transaction platform, digital identity information associated with the first user, wherein the digital identity information includes identifying information associated with the device. The method may also include determining the digital identity information matches a record of financial data associated with the first user. The method may also include determining, based on the record of financial data, transaction pricing data for a first vehicle, the transaction pricing data including a total purchase price and a periodic payment amount. The method may also include sending, to the device, a user (Continued)

interface configured to present the vehicle and transaction pricing.

21 Claims, 7 Drawing Sheets

(56) References Cited

U.S. PATENT DOCUMENTS

| | | | | |
|---|---|---|---|---|
| 11,010,827 | B1 * | 5/2021 | Latronico | G06Q 40/03 |
| 11,080,725 | B2 * | 8/2021 | Dagley | G06F 17/18 |
| 11,508,007 | B2 * | 11/2022 | Scopazzi | G01C 21/3679 |
| 11,521,225 | B1 * | 12/2022 | Bourgeois | G06Q 40/03 |
| 2008/0167907 | A1 * | 7/2008 | Marcken | G06Q 10/047 705/5 |
| 2013/0024404 | A1 * | 1/2013 | Zacharia | G06Q 10/02 706/12 |
| 2013/0073387 | A1 * | 3/2013 | Heath | G06Q 30/02 705/14.53 |
| 2013/0073473 | A1 * | 3/2013 | Heath | G06Q 30/0241 705/319 |
| 2014/0180826 | A1 * | 6/2014 | Boal | G06Q 30/0207 705/14.66 |
| 2014/0229311 | A1 | 8/2014 | Colson et al. | |
| 2016/0189260 | A1 * | 6/2016 | Nagla | G06Q 30/0611 705/26.4 |
| 2016/0314529 | A1 * | 10/2016 | Dolle | G06Q 40/03 |
| 2016/0350850 | A1 * | 12/2016 | Shields | G06Q 40/03 |
| 2017/0323345 | A1 * | 11/2017 | Flowers | G06Q 30/0269 |
| 2018/0165763 | A1 | 6/2018 | Dolle et al. | |
| 2019/0222567 | A1 * | 7/2019 | Caldera | G06F 21/45 |
| 2019/0333054 | A1 * | 10/2019 | Cona | G06F 21/6272 |
| 2019/0370896 | A1 * | 12/2019 | Scopazzi | G06Q 40/025 |
| 2019/0392447 | A1 * | 12/2019 | Hutchinson | G06Q 30/0256 |
| 2020/0293586 | A1 * | 9/2020 | Singhal | G06F 16/9574 |
| 2020/0320611 | A1 * | 10/2020 | Price | G06Q 30/0627 |
| 2020/0372574 | A1 * | 11/2020 | Sundaram | G06F 21/6245 |
| 2020/0387879 | A1 * | 12/2020 | Berry | G06Q 20/14 |
| 2021/0201381 | A1 * | 7/2021 | Price | G06F 16/907 |

OTHER PUBLICATIONS

International Search Report and Written Opinion in International Application No. PCT/US2021/058328, filed Nov. 5, 2021, mailed Mar. 2, 2022, 10 pages.

* cited by examiner

SYSTEMS AND METHODS FOR IMPROVED VEHICLE TRANSACTION PLATFORMS

BACKGROUND

The conventional vehicle purchasing process can be complex and overwhelming. Consumers who undertake the process unaware of the specific type of vehicle that they intend to purchase may be faced with a vast pool of options including, for example, different vehicle makes, models, powertrain types, colors, add-on features, etc. Even if the consumer is able to narrow down this pool of potential options, financial considerations also need to be taken into account. For example, based on factors such as the consumer's credit history and debt-to-income ratio, as well as state and local vehicle tax regulations, among numerous other factors, the amount of money that a consumer may actually have to pay beyond a vehicle's listing price may vary dramatically. Additionally, if the consumer is to perform their vehicle purchase at a dealership, and does not obtain a pre-qualifying offer from a lending institution before going to the dealership, then they may be faced with a substantial amount of paperwork before the dealership can determine financing options for the consumer. Even if the consumer were to pursue an online vehicle shopping experience, they would still not be presented with exact monthly payment information for all of the vehicle results that are presented to them. They may be provided an estimated monthly payment, or may be provided an exact payment amount for a single vehicle after providing certain information to the conventional system, but it may be too calculation-intensive for a conventional system to display exact monthly payment amounts for a larger volume of listed vehicles displayed to the consumer. All of this may result in a tedious process for the consumer.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1A:
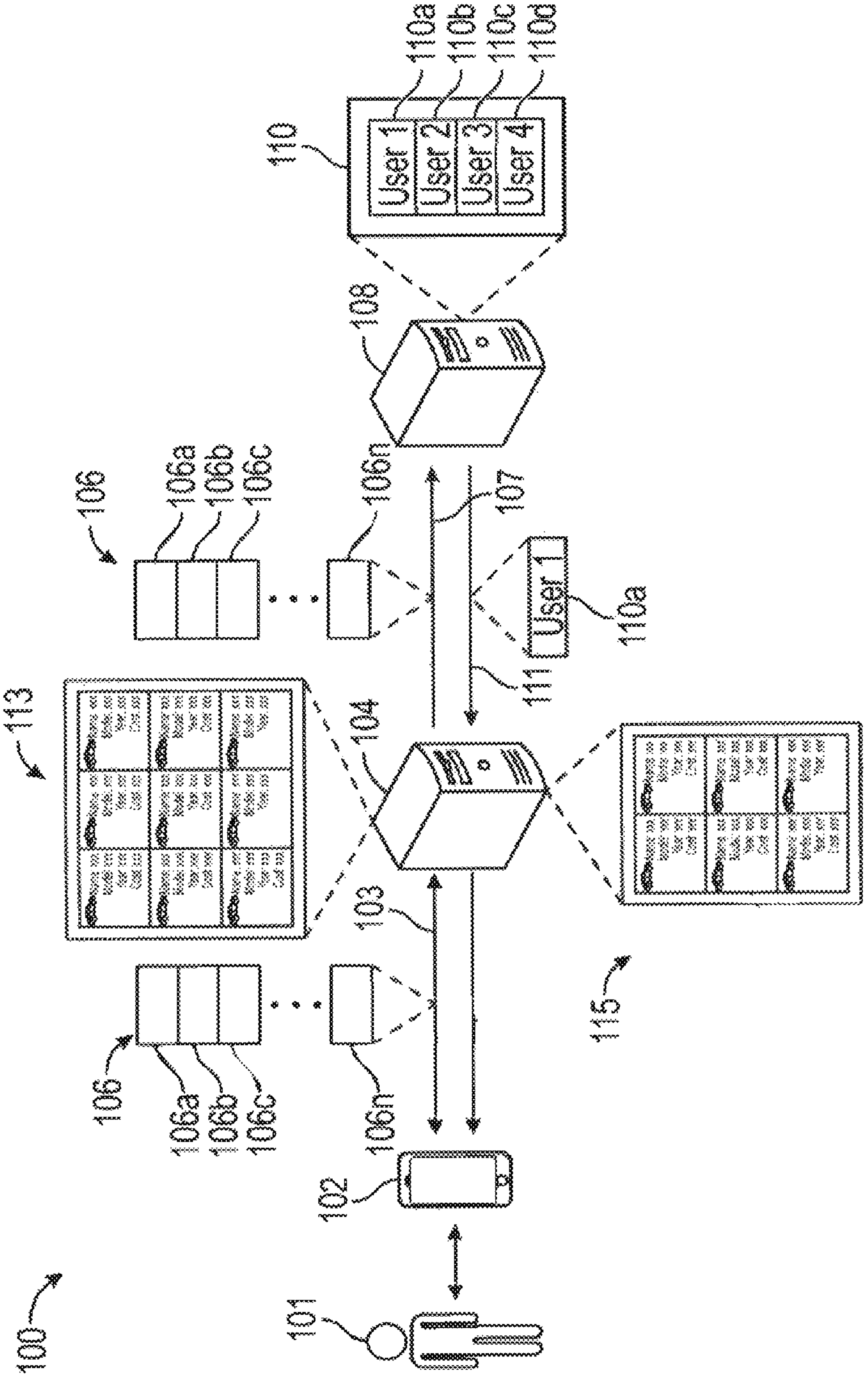
FIGS. 1A-1B depict example use cases, in accordance with one or more example embodiments of the disclosure.

The disclosure is directed to, among other things, systems and methods for improved vehicle transaction platforms. In some embodiments, the disclosure may more particularly relate to multifaceted systems and methods for improving the vehicle purchasing experience for consumers (it should be noted that the terms "consumer" and "user" may be used interchangeably herein). A vehicle transaction platform may refer to a system that may be in the form of a dealership system used by a consumer to facilitate a vehicle purchase. For example, the system may be implemented at a dealership where a salesman employed by the dealership may walk through a vehicle purchase with the consumer using the dealership system. As another example, the system may be a website that is independent of any dealership and that may allow consumers to browse vehicle listings, view information associated with each of the vehicle listings, and even purchase a listed vehicle through the website itself. Also, while described within the context of a vehicle transaction platform, the platform disclosure herein may also support transaction of other goods and services, and should not be limited to just vehicles.

In some embodiments, a first example facet of such systems and methods may involve determining consumer creditworthiness (for example, credit information associated with the consumer, vehicle financing interest rates and loan amounts that the consumer may be approved for, etc.) while requiring little to no information to be actively provided by the consumer (for example, little to no personally identifiable information (PII)). A second example facet of such systems and methods may include only displaying vehicles that a consumer is most likely to be interested in, while also including customized financing information (exact monthly payments, interest rates, etc., customized to the consumer) for one or more of the vehicles that are presented to the consumer. All of this information may be capable of being presented to the consumer in real time and even before receiving any data inputs (for instance, PPI) that are actively provided by the consumer. The vehicle options and financing information being presented to the consumer may also be dynamically updated based on inputs received from the consumer, such as a preferred down payment amount, vehicle trade-in value, a zip code of the consumer (for example, for tax determinations), a desired monthly payment range, etc. That is, exact payment information may be initially provided to the consumer before they begin providing input information, and the exact payment amounts may later be refined in real-time as the consumer provides this input information. These multifaceted systems and methods may significantly improve the vehicle purchasing experience for the consumer by, with little to no active informational input requirements from the consumer, presenting a listing of vehicles that the consumer is likely to be interested in purchasing (and that the consumer will likely be able to afford even after additional financing considerations beyond the sticker price of the vehicle), and by including exactly payment amounts for that specific consumer for many if not all of the presented vehicles in real-time. Conventional vehicle transactions, on the other hand, may entail a consumer filtering vehicles by sticker price, and the consumer may not be presented with exact final payment amounts customized for that consumer until financing offers, state and local tax amounts, and other financing details are subsequently determined after the consumer has selected a vehicle. The systems and methods described herein allow the consumer to filter through batches of vehicles that include exact payment amounts for that consumer without having to select a particular vehicle and go through the financing process before knowing the exact payment amount for the vehicle.

With respect to the first facet of the systems and methods described herein, typical vehicle transactions may involve a consumer financing at least a portion of the vehicle purchase. In some cases, especially when the consumer is seeking dealership financing, the consumer may be required to fill out one or more forms or otherwise manually provide personally identifiable information (PII), among other information, before a financing offer for the vehicle can be determined. That is, the consumer may select a vehicle with a particular sticker price, but this sticker price may not reflect the final purchase price of the vehicle as additional financing details may then need to be determined (for example, interest rates, state and local vehicle tax percentages, ancillary insurance costs, etc.). This may serve to further lengthen an already time-consuming vehicle purchase process for the consumer, and make it more difficult for the consumer to discern what vehicles are within their purchasing power without going through the entire financing process for each individual vehicle. Given this, the first facet of the systems and methods described herein may serve to eliminate (or at least mitigate) the need for the consumer to manually provide information to obtain a financing offer and/or determine other payment details beyond the mere sticker price associated with various vehicles.

In some embodiments, this may be accomplished by obtaining "digital identity" information associated with the consumer and leveraging third party systems that may include databases of users to identify a match between the digital identity information obtained from the consumer to information associated with a user stored within the database. Such digital identity information may include information associated with a device that the consumer may use to access the vehicle transaction platform. Thus, the digital identity information may be passively-obtained information. That is, it may be information that may not be actively provided by the consumer, but may instead be obtained from some source other than the consumer (for example, the consumer's mobile device). For example, the digital identity information may include an Internet Protocol (IP) or Media Access Control (MAC) address of the device, an Internet Service Provider (ISP) associated with the device, a cell tower that the device is connected to, saved cookies associated with the device and the vehicle transaction platform, or any other digital information associated with the device. The digital identity of the consumer may also be supplemented with additional information as well. For example, given that the ISP of the device may be determined, a request may be made to the ISP for additional information about the device and/or the consumer from the ISP itself.

Once the digital identity of the consumer is compiled, it may be provided to a third party system (for example, the third party system may be a credit reporting agency) that may include a database of users and information associated with such users. For example, the information associated with the user may include information such as a name of the user, an email address associated with the user, a phone number associated with the user, a social security number of the user, among other types of information pertaining to the user. The third party system may use the digital identity information to determine if a match exists between information associated with any of the users in the database and the digital identity information of the consumer. The determination that a match exists may also involve the use of a confidence factor or threshold that the match exists. For example, the confidence factor may determine if an exact match between the digital identity information and the information associated with any of the users in the database. If an exact match does not exist, then no indication of the consumer's identity may be provided. If a match is determined, then the third party system may provide an indication of the consumer's identity. Beyond merely providing confirmation, the third party system may also provide credit information associated with the user (for example, credit history, credit score, etc.). The third party system may also provide any other types of information about the user as well, such as open credit lines, annual income, employer information, etc. This credit information may then be used by the vehicle transaction platform to determine potential financing offers for the consumer. For example, the vehicle transaction platform may provide the credit information to one or more lending institutions to determine what potential loan amounts and interest rates the consumer may qualify for based on their credit information. The end result of this may be that the consumer may be matched to a lender rate card to determine financing structures that consumer may qualify for, all while the consumer may only be required to manually provide little to no information. It should also be noted that while the above described a third party system determining the identity of the consumer, the same processes may be performed through an internal or local system as well (for example, a dealership system or a system that hosts an online platform). That is, the system performing the identity determinations does not necessarily have to be a third party system.

In some instances, it may not be feasible to verify the identity of the consumer without obtaining information beyond what is compiled in the digital identity for the consumer. For example, the third party system may not be able to identify a match between the information in the digital identity and information associated with the database of users maintained by the third party system. As another example, the third party system may be able identify a partial match, but a confidence value that the consumer associated with the digital identity and the user in the third party system database match may be below a threshold confidence value. In such cases, the vehicle transaction platform may then request information from the consumer. However, even when such information is requested from the consumer, such as with a user interface generated and sent to the consumer for the collect of such information, in order to mitigate the amount of information that the user needs to provide, the vehicle transaction platform may only request a single piece of information from the consumer at a time. For example, the vehicle transaction platform may request a phone number from the user. The vehicle transaction platform may then supplement the digital identity information with the phone number and again provide the digital identity to the third party system. If the third party system is then able to identify a match with a user in the database based on the updated digital identity including the supplemental information, then no more information needs to be requested from the user. However, if the third party system still is not able to identify a match, then the vehicle transaction platform may request another piece of information, such as with a second user interface generated and sent to the consumer. This process may proceed iteratively until a match is identified (for example, a match that meets a threshold confidence score). This process of requesting only a piece (or a small amount of information) from the user at a time may serve dual purposes. First, it may reduce the burden on the consumer by not requiring them to provide a long list of information, which may be time consuming. Second, it may also address privacy concerns, as the amount of PII information that the consumer needs to provide may be reduced.

In some embodiments, once the identity of the consumer is verified, and the credit information for the consumer is determined, different vehicle loan financing structures for the consumer may be obtained from various lending institutions. For example, based on the consumer's credit information, a first lending institution may indicate that the consumer qualifies for a vehicle loan of up to $50,000 at an interest rate of 4.5% and for up to a term length of 72 months, and a second lending institution may express that the consumer qualifies for a vehicle loan of up to $80,000 at an interest rate of 3.7% and also for up to a term length of 72 months. The consumer may also automatically receive pre-approval for these financing structures. Other details regarding potential financing structures for the consumer may also be determined, such as the taxes that may apply to the purchase of a vehicle, government credits the consumer may be entitled to based on the type of vehicle (for example, a credit that may be granted to a consumer purchasing an electric vehicle), ancillary insurance options for the vehicle, among other details. This information may be determined, for example, based on a known address of the consumer by referencing the vehicle rules and regulations of the state and/or county that the consumer lives in. As described above, these financing structures may be determined for the consumer without the consumer having to fill out any forms or provide any personal information (except in circumstances when the identity of the user is not able to be determined based on their digital identity information alone). Additionally, beyond determined pre-approved financing structures for the consumer, the consumer identity verification may also allow the vehicle transaction platform to internally reduce the envelope of vehicles determined to be relevant to the consumer to a subset of the vehicle inventory. In other words, the vehicle transaction platform may include a total inventory of vehicles available for purchase by any number of consumers. Based on the verified identity of the consumer and the credit information of the consumer, the vehicle transaction platform may determine that the consumer is only financially able to purchase a particular subset of the vehicles of the total vehicle inventory. For example, if the credit information of the consumer is such that the best offer provided by a lending institution may be for $70,000, then the vehicle transaction platform may filter out any vehicles valued above $70,000. Likewise, the filtering may be performed based on a monthly payment that a consumer can afford. For example, the best offer provided by a lending institution may translate to payments of $500 per month for a term period of 48 months. In this case, the system may filter out vehicles that would cost the consumer more than $500 a month over a term period of 48 months. Thus, when the vehicle transaction platform displays a vehicle listing for the consumer to browse, only the vehicle's that the consumer can afford will be displayed. This may help to remove extraneous information that is irrelevant to the consumer and simplify their vehicle searching process. In some instances, while the total vehicle inventory may initially be reduced to the subset, the subset may also be dynamic based on inputs provided by the consumer. For example, if the consumer indicates that they are able to provide a down payment of $20,000, then the subset may increase as this down payment would allow the consumer to afford a larger subset of vehicles than if they were financing 100% of the vehicle purchase.

In some embodiments, the envelope of vehicles may also be reduced based on risk scores that are determined for each of the vehicle's in the vehicle inventory. These risk scores may be determined because not all cars may be equal in terms of financing, even if the vehicles are associated with the same sticker price. Some vehicles may be associated with a higher interest rate even given the same sticker price and consumer performing the purchase. For example, a newer Ford F100 pickup might have a similar sticker price as an older Bentley Continental GT, the risk score for the Ford may be lower because the depreciation for the Ford maybe more consistent and slower than that of the Bentley. The risk score may also be based on any number of other factors. For example, some lending institutions may not finance vehicles of a certain age or a certain mileage. As another example, older vehicle may not be eligible for longer loan terms, and thus may be associated with a higher monthly payment. Thus, even though the Ford and Bentley have the same sticker price, the risk score determined for these two vehicles may be different. Vehicles that fail to satisfy a given risk score may, in some instances, also be removed from the subset of vehicles presented to the consumer. In this sense, the risk score may serve as a filter to reduce the number of vehicles for which payments may need to be calculated.

With respect to the second facet of the systems and methods, a consumer engaging in a conventional vehicle purchase process may be presented with an exact payment amount (for example, a payment amount customized to the particular user that indicates the amount of money the user should actually expect to pay for the vehicle rather than mere estimated payment information) from a dealership for a single vehicle only after the vehicle has been selected by the consumer for purchase. In some cases, conventional online platforms may also provide the capability for the consumer to determine an estimated monthly payment for the vehicle, however these estimated monthly payments are not customized for the particular user and may not necessarily indicate the actual amount the user should expect to pay. These estimated payments may be based on average terms and rates, or may be based on basic information entered by the user (term lengths, down payment, etc.). These estimated payments may not take into account all of the factors that are involved in producing an actual amount the user will pay for the vehicle. For example, the credit information associated with the user and state and local taxes, applicable dealership fees, and/or aftermarket products or accessories, among other information that these conventional systems may fail to consider. Thus, the second facet of the systems and methods described herein may allow the user to browse vehicle inventory and view the actual amount of money they should expect to pay for the vehicle if they decided to purchase the vehicle from the inventory (for example, if the user were browsing a listing of vehicles in an online platform, the platform would display the vehicles and would display the actual monthly payments (among other financing information) the user would pay if they decided to purchase that vehicle from the listing. That is, the user may instantly purchase that vehicle from the listing and the financing information would not change after the user decides to select the vehicle.

Additionally, providing such exact payment information (for example, customized for the user to indicate the actual amount they should expect to pay) for many, if not all, of the vehicles found within a vehicle inventory may be too calculation-intensive to provide to the consumer in real-time, especially if the consumer is dynamically updating parameters of the vehicle purchase (e.g., down payment amount, trade-in vehicle, vehicle type, etc.). To put these calculation requirements in perspective, pre-calculating exact payment amounts for a vehicle inventory including 5,000 vehicles with 1,000 down payment options, 350 net trade-in options, five payment term options, six tiers, and 50,000 tax locations may result in 2,625 trillion total calculations required to build a cache to sustain all of these pontifical combinations. Assuming conventional APIs may be able to perform 50 calculations per second, it would take over 13 million days to calculate all of the possible permutations. Even if all of these possible permutations were able to be pre-calculated and stored, the size of the database required to house such data would be in the realm of 244 million terabytes. Having a database of this size may make it extremely difficult for any modern system to perform lookup functions and return results instantly to the consumer. Either way, the consumer would experience unacceptable latency in receiving the results. It would be desirable for consumers to have a full list of vehicles and exact prices, instead of what they have to do now, but the aforementioned calculation-intense processing that would be required to produce this may make this unfeasible with conventional systems.

Thus, the second facet may allow for consumers to be provided such exact purchase amount information for a full listing of vehicles included in the vehicle inventory by limiting the number of calculations that need to be performed in real-time. This may be accomplished by pre-determining one or more consumer vehicle search patterns. Such search patterns may allow the vehicle transaction platform to predict the types of vehicles and types of financing structures (term length of the financing structure, interest rates, etc.), among other information, that a particular type of consumer falling within the pattern would likely be associated with. These patterns may be pre-determined using machine learning (for example, a machine learning module 209 as described with respect to FIG. 2A below or any other machine learning module and/or system described herein). Alternatively, the patterns may be determined using any other type of artificial intelligence. In determining the various patterns that may exist, the machine learning may first receive a number of data inputs. The data inputs may include, for example, consumer browsing behavior, consumer credit profiles, deal structures that consumers are creating, typical down payments, types of vehicles consumers are searching for, etc. Based on these inputs, the machine learning may establish the one or more pre-determined consumer vehicle search patterns. These pre-determined search patterns may then be stored in cache of the vehicle transaction platform for future reference (or alternatively any other type of storage either locally to the vehicle transaction platform or remotely from the vehicle transaction platform). By storing these pre-determined consumer vehicle search patterns, if a given consumer that accesses the vehicle transaction platform to perform a search for vehicles to purchase matches one of the pre-determined patterns, then the vehicle transaction platform may merely need to present a portion of the total vehicle inventory pre-determined to be associated with that consumer vehicle search pattern. For example, a pattern may involve a preference of new vehicles over used vehicles, a preference of new vehicles over certified vehicles, a preference of certified vehicles over used vehicles, a preference of foreign vehicles over domestic vehicles, a certain body style preference, a preference of vehicles in a certain price range, or any other types of consumer vehicle shopping patterns. This may eliminate or reduce the need for the vehicle transaction platform to perform real-time calculations (for example, real-time calculations to determine the exact financing information for the vehicles being presented to the consumer) for the consumer if the consumer matches one of the patterns, and may also reduce the amount of latency experienced by the consumer in receiving the listing of vehicles and associated exact payment amounts associated with each of the vehicles. This may also increase the convenience of the vehicle transaction platform for the consumer, as the consumer may then only be presented with the types of vehicle listings and deal structures that they are most likely to search for without the consumer having to provide any input information (for example, without the user having to input any search queries to the platform) to the vehicle transaction platform. In some instances, the consumer may not match one of the pre-determined patterns. In such cases, real-time calculations may need to be performed. However, the use of the patterns stored in cache serves to reduce the number of instances in which real-time calculations are performed, and consequentially reduce the computational requirements of the vehicle purchasing platform to a more feasible level.

Figure 1B:
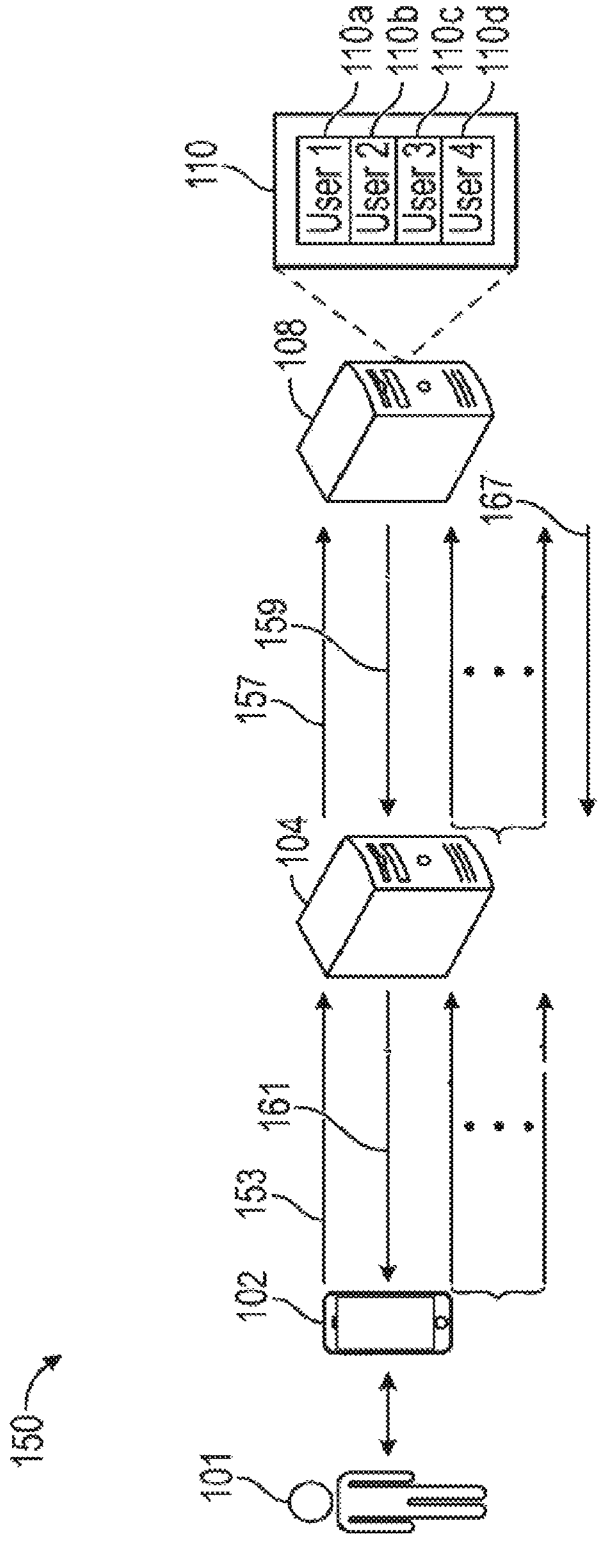

Turning to the figures, FIGS. 1A-1B depict an example use case 100 and an example use case 150 respectively, where both use case 100 and use case 150 may pertain to determining vehicle financing structures for a user 101 while requiring little to no input information from the user 101 (for example, the "first facet" described above). That is, determining vehicle financing structures for the user 101 while requiring little to no active input from the user. Use case 100 may differ from use case 150 in that use case 100 may involve no information being provided by the user 101, whereas use case 150 may involve the user 101 manually providing at least some information. In some instances, a combination of use case 100 and use case 150 may represent an example of an overall use case for determining financing information for potential vehicle purchases by the user 101. That is, the use case 100 may be an example of a first portion of the process, and the use case 150 may be an example second portion of the process that, in some instances, may take place after the use case 100. This may happen if the identity of the user 101 is not able to be discerned, or discerned to a particular confidence level, based on only digital identity information 106 associated with a device 102 of the user 101. In such cases, the use case 150 may be triggered and the user 101 may provide a minimal amount of information to supplement the digital identity information 106 to confirm the identity of the user 101.

Figure 5:
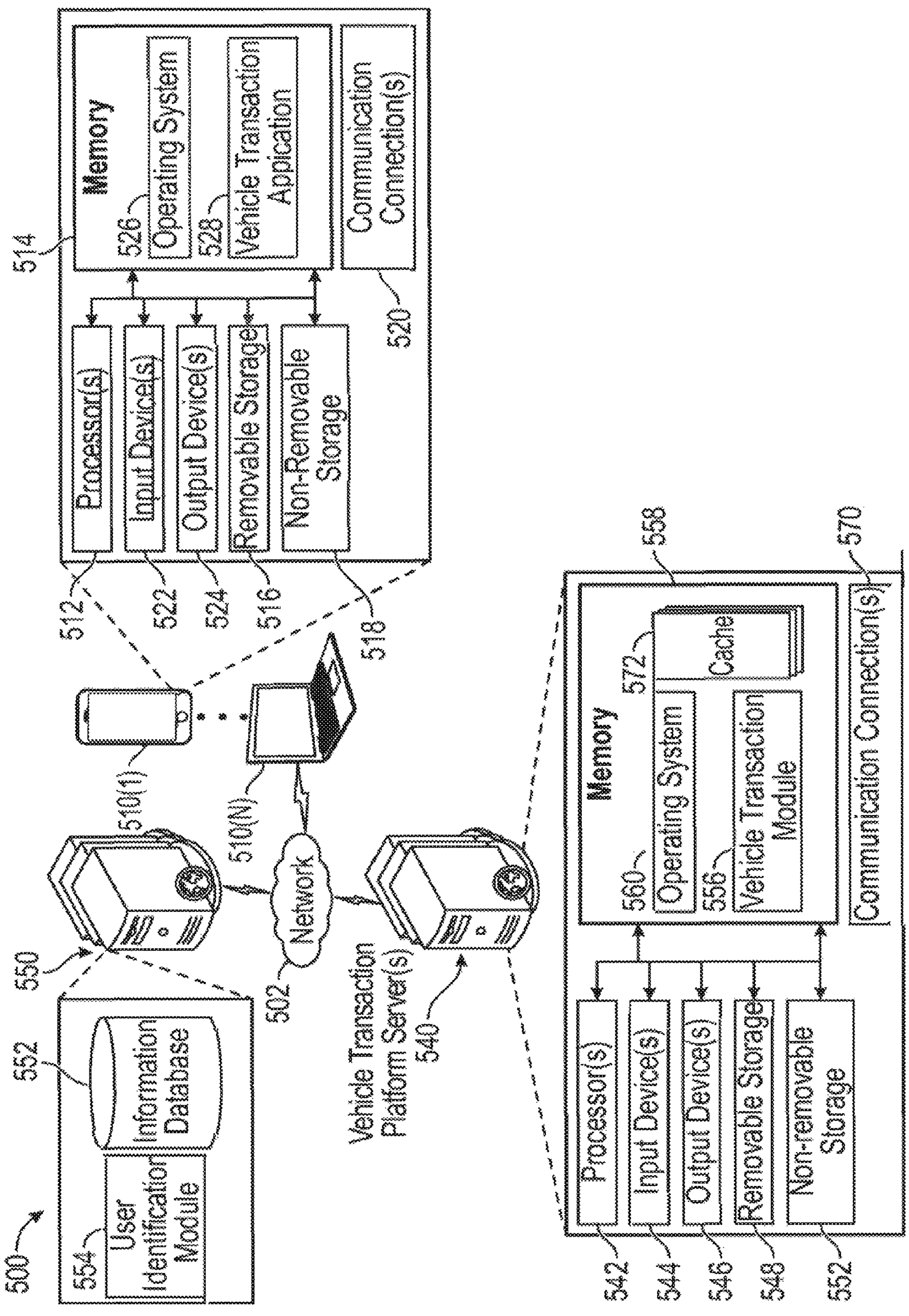
FIG. 5 depicts an illustrative system architecture, in accordance with one or more example embodiments of the disclosure.

In some embodiments, use case 100 may begin at 103 with the user 101 interacting with a vehicle transaction platform 104 through a device 102 (the vehicle transaction platform 104 and device 102 may be described in more detail with respect to FIG. 5). Through this interaction at 103, the vehicle transaction platform 104 may receive information regarding a "digital identity" of the user 101. The digital identity information 106 (for example, digital identity information 106*a*, 106*b*, 106*c*, or any number of other digital identity information) may include, for example, identifying information associated with the device 102, such as an Internet Protocol (IP) address, a Media Access Control (MAC) address, one or more cookies, an Internet Service Provider associated with the device, among other identifying information. This information may be requested from the device 102 by the vehicle transaction platform 104, or may simply be provided by the device 102 to the vehicle transaction platform 104 through communications between the device 102 and the vehicle transaction platform 104. The digital identity information 106 may also be supplemented by information known to the ISP associated with the device 102. For example, the ISP may provide information such as a name, an email address, a phone number, a street address, or any other types of identifying information. The interaction at 103 (as well as any other steps of the use cases described herein) may be facilitated through a network (for example, as described with respect to FIG. 5). The ISP may be a service provider that provides connectivity to the network through the device 102.

In some embodiments, once the digital identity information 106 is compiled by the vehicle transaction platform 104, the vehicle transaction platform 104 may provide this digital identity information 106 to a third party system 108 (for example as shown at 107), and the third party system 108 may use the digital identity information 106 to determine the identity of the user 101. The third party system 108 may host a user database 110 including entries regarding one or more users (e.g., user 110*a*, user 110*b*, user 110*c*, user 110*d*, or any number of other users). In some instances, the third party system 108 may be a consumer credit reporting agency that maintains information about such users. However, such a user database 110 may similarly be maintained independently from such a consumer credit reporting agency as well. That is, the user database 110 may be maintained internally to the vehicle transaction platform 104 instead of housed in a separate system (the third party system 108). The third party system 108 may use the digital identity information 106 provided by the vehicle transaction platform 104 to determine the identity of the user 101 by comparing the digital identity information 106 with information associated with the users stored in the user database 110. If a match is identified between the identity information 106 received from the vehicle transaction platform 104 and any information that is associated with any of the users stored in the user database 110 then it may be determined that the identity of the user 101 is the same as the identity of the particular user listed in the user database 110 for which the match was identified.

In some instances, the third party system 108 may establish one or more confidence values that the user 101 associated with the digital identity information 106 and any of the one or more users listed in the user database 110 are the same user. For the sake of exemplification, use case 100 may show user 110*a* being determined to be a match with the digital identity information 106 of the user 101.

In some embodiments, after the identity of the user 101 is determined (in this case, user identity 110*a*), the third party system 108 may provide the user identity 110*a* to the vehicle transaction platform 104 (for example, shown at 111). The third party system 108 may also provide other information associated with the user identity 110*a* that may be useful to the vehicle transaction platform 104 in determining financing structures for the user 101. For example, the third party system 108 may provide a credit information associated with the user 101. The vehicle transaction platform 104 may then use the user identity 110*a* and the other information received from the third party system 108 and other sources (for example, state and local tax laws) to determine potential financing structures that the user 101 may qualify for. Financing structures may include information regarding options the user 101 may have to finance a vehicle for purchase. For example, a financing structure may involve a total loan amount the user qualifies to receive from a particular lending institution, an interest rate, a term length (a period of time over which the loan is to be paid off), and/or any other information relevant to the financing of a vehicle. The vehicle transaction platform 104 may determine the potential financing structures that the user 101 may qualify for by providing the user identity 110*a* and other information associated with the user identity 110*a* and a particular vehicle to one or more lending institutions. The vehicle transaction platform 104 may also internally store information about financing offers that various lending institutions typically provide to users with particular credit histories, and may be able to determine or predict the financing structures that the user 101 may qualify for internally to the vehicle transaction platform 104. Based on these financing structures from the various lending institutions, the vehicle transaction platform 104 may also determine which financing structure provides the best option for the user. For example, the best option may include a financing structure with a largest loan amount, a lowest interest rate, a lowest down payment, etc. The end result of use case 100 may be that the vehicle transaction platform 104 may be able to determine potential financing deals for the user 101 without the user 101 having to fill out any forms or otherwise manually provide information to the vehicle transaction platform 104.

In some embodiments, in addition to determining financing structures that the user 101 may qualify for, the use case 100 may also be beneficial in that a pool of vehicles that the user 101 may financially be capable of purchasing may be narrowed. That is, the vehicle transaction platform 104 may include a total inventory 113 of vehicles that includes all of the vehicles available on the vehicle transaction platform 104 for purchase. After the identity of the user 101 is confirmed and the financing structures that the user 101 qualifies for are established, the total inventory 113 may be reduced to an inventory subset 115 of vehicles that the user 101 is financially able to purchase given the financing structures for which the user 101 qualifies. For example, it may be determined that the maximum loan amount the user 101 is capable of receiving is for $70,000. Given this, any vehicles that are priced above $70,000 may not be included in the inventory subset 115. Vehicles may also be removed from the inventory subset 113 to derive the inventory subset 115 based on factors other than the total loan amount for which the user 101 qualifies. For example, certain vehicles in the total vehicle inventory 113 may only qualify for certain term lengths. A first vehicle may qualify for term lengths up to 72 months, whereas a second vehicle may only qualify for term lengths up to 48 months. It should be noted that these are only examples of how the total vehicle inventory 113 may be reduced to the inventory subset 115, and that the inventory subset 115 may be determined in any number of other manners as well. The end result of this reduction to the inventory subset 115 may be that the processing requirements on the vehicle transaction platform 104 may be reduced with respect to the user 101, as the vehicle transaction platform 104 may only need to perform calculations with respect to the smaller inventory subset 115 rather than the total vehicle inventory 113. The reduction to the inventory subset 115 may also benefit the user 101, as they may not be presented with vehicles in the total vehicle inventory 113 that they are not financially capable of purchasing (thus, the user 101 only needs to scroll through a small number of vehicles to identify the vehicle they want to purchase). Of course, the inventory subset 115 may be dynamic based on certain inputs that are provided by the user 101. For example, the user 101 may subsequently specify that they are able to provide a down payment of $10,000. In such cases, the inventory subset 115 may reintroduce some of the vehicles that were originally removed, as the pool of vehicles that the user 101 may be able to financially afford may increase based on their ability to provide the down payment. The inventory subset 115 may likewise decrease if the user 101 indicates that they are only interested in certain types of vehicles or financing structures. For example, the user 101 may indicate that they are only interested in term lengths of 48 months. Given this, the inventory subset 115 may shrink to remove any vehicles in the total vehicle inventory 113 that are not associated with 48 month term lengths. The inventory subset 115 may also dynamically increase and decrease based on any number of other inputs received by the user 101. The benefit of the use case 100, however, may be that the inventory subset 115 may initially be determined even before any inputs are provided by the user 101, thus limiting the burden on the user 101, and ultimately on the vehicle transaction platform 104.

Turning to FIG. 1B, use case 150 may be similar to use case 100 (that is any aspect of use case 100 may similarly apply to use case 150 as well, such as the narrowing of the total vehicle inventory 113, or any other aspect of use case 100 as well), but may involve a scenario in which the identity of the user 101 may not be able to be confirmed based on only the digital identity information 106, or may not be able to be confirmed to a certain threshold confidence value. As such, similar to use case 100, use case 150 may begin with the user 101 interacting with a vehicle transaction platform 104 through a device 102 at 153. The interaction may involve the same or similar types of digital identity information 106 being provided to the vehicle transaction platform 104 from the device 102. The digital identity information 106 may be provided to the third party system 108 at 157, and the third party system 108 may undertake the same process described in use case 100 of comparing the digital identity information 106 received from the vehicle transaction platform 104 to any information that is associated with any of the users stored in the user database 110. However, unlike the use case 100, the use case 150 may involve a scenario where the third party system 108 is either unable to determine a match between the digital identity information 106 and any of the users in the user database 110, or is unable to determine a match with a confidence factor above a threshold value. In this scenario, the third party system 108 may provide such an indication to the vehicle transaction platform 104 at 159, and the vehicle transaction platform 104 may provide an indication to the user 101 through the device 102 that additional information may be required at 161. Instead of requesting a large volume of information from the user 101 at one time, however, the vehicle transaction platform 104 may instead only request one piece (or a minimal amount) of additional information from the user 101 at a time. The vehicle transaction platform 104 may receive form the user 101 the one piece (or minimal amount) of additional information and supplement the digital identity information 106. The vehicle transaction platform 104 may then provide the supplemented digital identity information to the third party system 108, and the third party system 108 may determine if it is able to identify a match given the supplemental information it now has. If so, then the third party system 108 may provide the determined identity of the user 101 to the vehicle transaction platform 104 at 167. If not, a process may continue with the vehicle transaction platform 104 iteratively requesting additional information from the user 101 and providing the information to the third party system 108 until the third party system 108 is able to determine a match for the identity of the user 101. The use of this iterative process rather than simply requesting a large volume of information from the user 101 at once may provide a number of benefits. First, it may reduce the burden on the consumer by not requiring them to provide a long list of information, which may be time consuming. Second, it may also address privacy concerns, as the amount of PII information that the consumer needs to provide may be reduced. Third, it may reduce the bandwidth and processing overhead needed to send and process a long list of PII the user might be called on to provide.

Figure 2A:
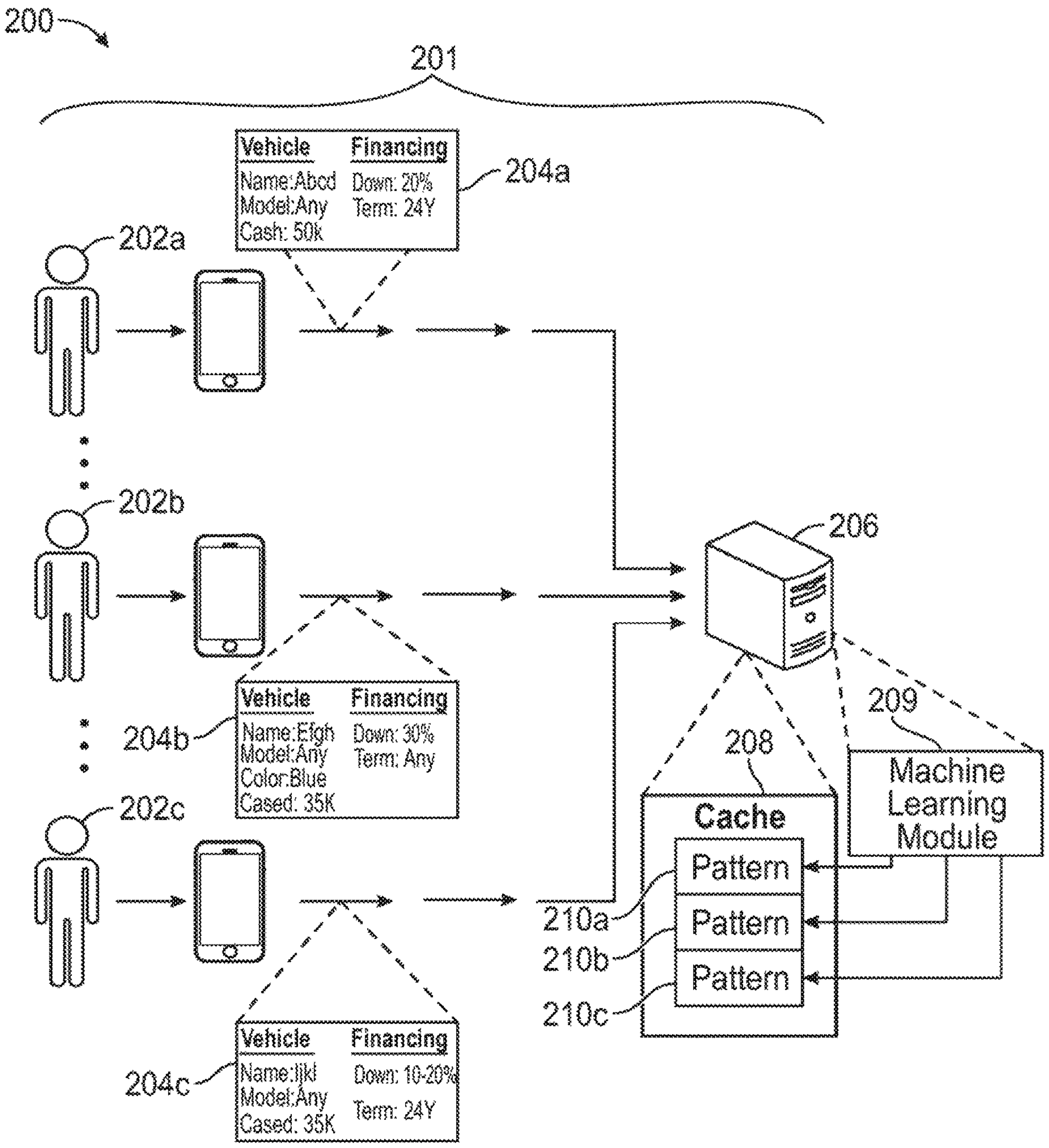
FIGS. 2A-2B depict example use cases, in accordance with one or more example embodiments of the disclosure.
Figure 2B:
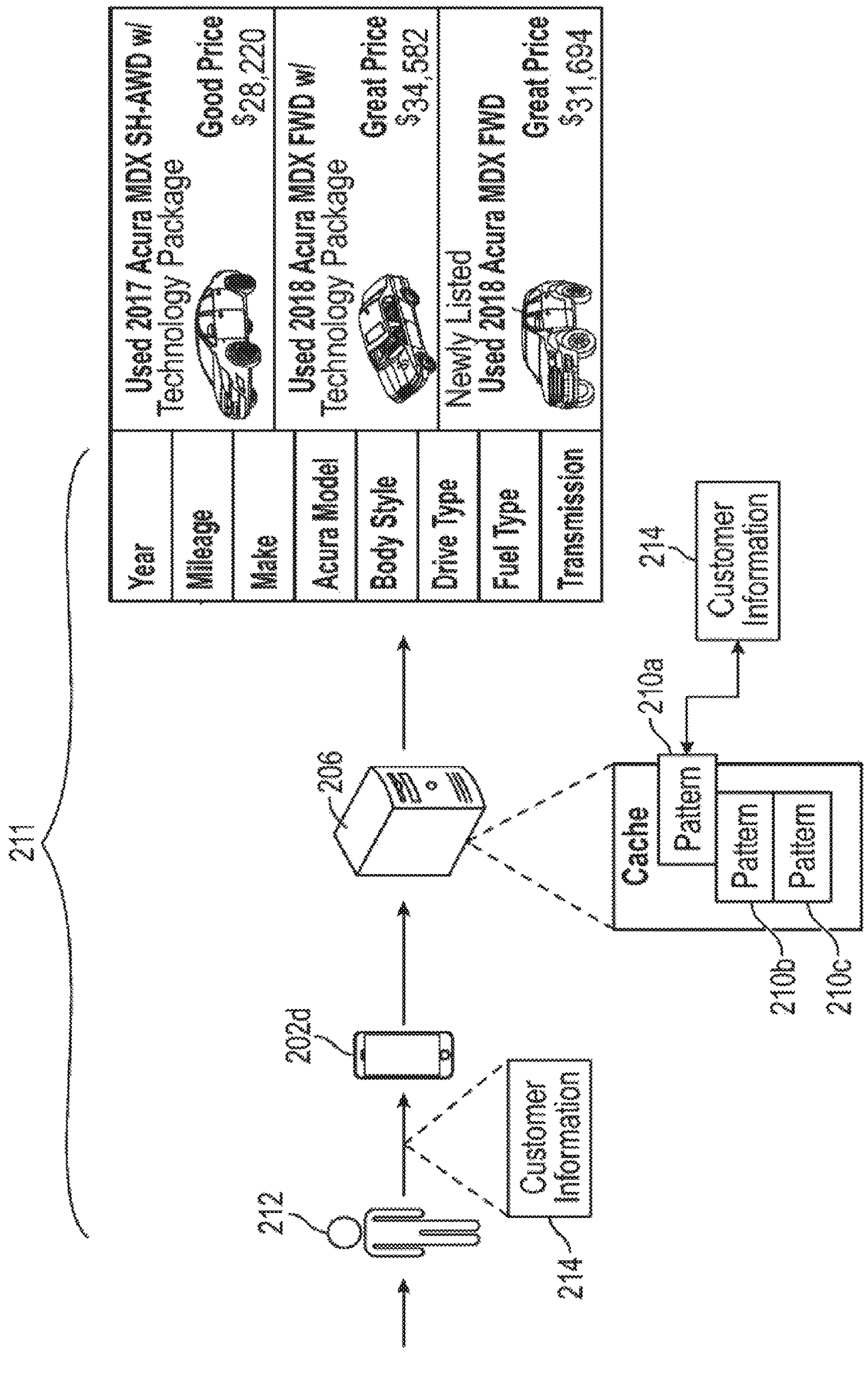

In some embodiments, FIG. 2A depicts another example use case 200. While use cases 100 and 105 may pertain to the first facet of the systems and methods described herein (for example, determining the identity of a user accessing the vehicle transaction platform and determining vehicle financing structures that the consumer qualifies for while requiring little to no input information from the consumer), use case 200 may pertain to the second facet. That is, use case 200 may pertain to at least presenting to the consumer a listing of vehicles (for example, a full inventory of the vehicles associated with the vehicle transaction platform 206 or a subset of the vehicle inventory) and exact payment amounts for different financing structures for some or all of the vehicles (for example, exact monthly payment amounts the consumer may have to pay for each vehicle). These vehicles and financing structures presented to the consumer may also be the vehicles and financing structures that the consumer is most likely to be interested in. This may provide the consumer with knowledge of exactly how much they would be paying for a particular vehicle per month and in total if they were to purchase the vehicle using one or more given financing structures. This may also benefit the consumer by only presenting the consumer with vehicle types and financing structures that are pertinent to the consumer (for example, vehicle types and financing deals that the user would be interested in or can otherwise afford), which may reduce the amount of extraneous information that the consumer needs to filter through. The same may apply to other types of information presented to the consumer, such as aftermarket products that fit within the financing deals. In some instances, the vehicle transaction platform 206 may also determine the exact financing structure that the consumer is most likely to be interested in and present this financing structure as a recommended financing structure in order to avoid needing to present multiple financing structures to the consumer. In even further instances, the vehicle transaction platform 206 may provide both a listing of various financing structure options as well as the recommended financing structure for the consumer. Conventional vehicle transaction system, on the other hand, typically only list vehicles by sticker price (for example, based on the value of the vehicle itself), and additional costs may be added on once the consumer selects the vehicle for purchase (for example, various taxes and dealership fees, as well as vehicle options, such as aftermarket products). Some conventional systems may be capable of providing an estimate of a monthly payment for a consumer, but these estimates may use a generic credit score (such as a Fair Isaac Corporation (FICO) score) and averaged interest rates from a single lender. In contrast, with respect to the systems and methods described herein, the consumer FICO score may be different that the generic scores used in the aforementioned conventional systems, and the generic interest rates may not apply to a particular vehicle due to factors such as vehicle age, vehicle mileage, vehicle price, and/or the specific location of the consumer, among other factors. In addition, the conventional systems may not factor localized government taxes and fees which may be frequently based on street address within a given zip code, but may instead only rely on a more broad zip code. Some conventional systems may also be capable of providing exact payment amounts for a single vehicle or a small volume of vehicles, but presenting this type of information for a large percentage of an available vehicle inventory may be too calculation-intensive to be feasible, or even possible, given conventional computational capabilities without the use of the technical improvements described herein. For example, in some cases, the only way convention systems may be able to supply an exact monthly payment may be after the consumer submits a credit application and the lender approves a deal structure for the consumer.

In some embodiments, use case 200 may begin at 201 with the vehicle transaction platform 206 (which may be the same as vehicle transaction platform 104, vehicle transaction platform server 540, or any other vehicle transaction platform described herein) pre-determining one or more consumer vehicle search patterns (for example, pattern 210*a*, pattern 210*b*, pattern 210*c*, or any other number of patterns). The one or more consumer vehicle search patterns may be determined, for example, using machine learning module 209. A consumer vehicle search pattern may provide an indication of a type or type(s) of vehicles, as well as one or more specific financing structures, that a consumer that falls within the pattern is likely to search for or seek. As one example, one pattern 210*a* may indicate that a particular type of consumer is likely to search for luxury-brand vehicles with a sticker price of between $40,000 and $70,000 and a financing structure including a term length of 36-48 months. The one or more consumer vehicle search patterns may be stored in cache 208 of the vehicle transaction platform 206 so that the vehicle transaction platform 206 does not have to perform as many real-time calculations when presenting vehicles and financing structures to a consumer performing a vehicle search on the vehicle transaction platform 206. That is, if a consumer that uses the vehicle transaction platform 206 to perform a search for a vehicle and an associated financing structure falls within one of the patterns stored in the cache 208, then the vehicle transaction platform 206 can simply access or request the pre-determined listing of vehicles and financing structures at or from the cache, including exact payment amounts, and present the vehicles and financing structures to the consumer without having to perform any real time calculations for each of the vehicles in the listing to determine the exact amount the consumer will have to pay for each vehicle under each financing structure.

In some embodiments, this pre-determination process described with respect to step 201 may be performed as follows. First, the machine learning module 209 may undergo an initial period of data input capture. The data inputs may include searches (for example, search 204*a*, search 204*b*, search 204*c*, and/or any other number of searches) performed by one or more consumers (for example, consumer 202*a*, consumer 202*b*, consumer 202*c*, and/or any other number of consumers) on the vehicle transaction platform 206 (including the types of vehicles and financing structures that the consumers searched for). For example as shown in FIG. 2A, the consumer 202*a* may have performed a search 204*a* for any Toyota vehicle with a sticker price of $30,000 or less, and may be searching for financing structures including a down payment of 20% and a term length of up to 48 months. Consumer 202*b* may have performed a search 204*b* for blue BMWs or Mercedes with a sticker price between $40,000 and $50,000 and financing structures including a down payment of 30% and any term lengths. Consumer 202*c* may have performed a search 204*ac* for any Honda vehicle with a sticker price of $35,000 or less and may be searching for financing structures including down payments of 10-20% and a term length of up to 48 months as well.

In some embodiments, the data inputs may also include information associated with each of the consumers (for example, consumer 202*a*, consumer 202*b*, consumer 202*c*) performing the searches. The information associated with each of the consumers may include any information about the consumers that may be relevant to their vehicle purchasing decision-making process. For example, the area that they live in, their annual income, demographic information, marital status, number of children, occupation, credit information, etc. The data inputs may also include a number of vehicles owned by the consumer. The data inputs may also include whether the vehicle the consumer is searching for would be a primary vehicle or a second vehicle (for example, for weekend driving). At least some of this information may be obtained through the first facet of the systems and methods described herein. That is, some of this information may be obtained once the identity of the consumer is known. The data inputs may also include consumer-independent information, such as the time of year at which the searches are being performed by the consumer (for example, more consumers may be interested in purchasing sports cars during the warmer months of the year), etc. In some cases, social media information for the consumers may be used to determine information about the consumer. Such as any of the information described above, or any additional information such as consumer hobbies or interests.

In some embodiments, as the machine learning module 209 is amassing all of these data inputs, it may be dynamically creating, removing, and/or adjusting one or more consumer search patterns (for example, pattern 210*a*, pattern 210*b*, pattern 210*c*, and/or any other number of patterns). The patterns may be stored either temporarily or permanently in cache 208 of the vehicle transaction platform 206, such that the patterns may subsequently be accessed. The patterns may also be stored in any other type of memory, and may also be stored remotely to the vehicle transaction platform 206 as well. In some instances, patterns that are observed more frequently by the machine learning module 209 may be permanently stored in the cache 208, whereas patterns that are more infrequent may be only temporarily stored in cache 208, and may later be replaced by new patterns that are observed by the machine learning module 209.

In some embodiments, once the initial period of data input capture (step 201) has been performed by the machine learning module 209 and the one or more patterns may be saved in the cache of the vehicle transaction platform 206, the one or more patterns may be used at step 211 to improve the vehicle searching experience of a subsequent consumer 212. This process at 211 may be performed as follows. First, the consumer 212 may access the vehicle transaction platform 206 through a device 202*d*. As the consumer 212 is accessing the vehicle transaction platform 206, the machine learning module 209 may capture or receive information 214 about the consumer 212 in order to determine if the consumer 212 falls within any of the patterns that are saved in the cache 208 of the vehicle transaction platform 206. As one example, the machine learning module 209 may receive information 214 that the consumer 212 is a male between the ages of 30-50, has a household income of $100,000 per year, and is married with three kids. The machine learning module may also determine that the consumer 212 has purchased three vehicles in the past, including three Honda vehicles with sticker prices between $15,000 and $30,000 each. The machine learning module 209 may also determine that the consumer 212 lives in a suburban region based on the consumer's zip code. It should be noted that these are just examples of some of the information 214 that the machine learning module 209 may receive about the consumer 212, but any other information that may be relevant to the consumer's vehicle purchasing decision-making may also be determined (for example, any of the other data inputs described herein, as well as any other data inputs that may not necessarily be described herein). Once the machine learning module 209 has obtained the information 214, it may then determine if the information 214 indicates that the consumer 212 falls within any of the patterns stored in the cache 208 of the vehicle transaction platform 206. As depicted in the use case 200, the machine learning module 209 in this instance may determine that the consumer 212 matches pattern 210*a*. In this particular use case, pattern 210*a* may involve a cluster of consumers who are likely to purchase affordable sedans in a lower price range of under $30,000 for mid-range term lengths in between 36-60 months. Given this, the number of vehicles within the vehicle inventory of the vehicle transaction platform 206 that the consumer 212 is likely to be interested in may include a particular subset of the total vehicle inventory. As an additional non-limiting example, a notable percentage of luxury cars may be purchased in cash, so the machine learning module may know that based on the consumers income and past purchase history, that the consumer may want to be presented with a cash structure with GAP insurance. For example, it may be known that the consumer has owned two Ferraris in the last five years, and that with each one the consumer paid cash and purchased GAP insurance. If the consumer is using the transaction platform to view the new McLaren GT, a similar cash deal structure may be recommended. It should be noted that while reference is made herein to a "machine learning module 209," this module may also comprise one or more sub-modules. For example, a first example sub-module may be used for recommending deal structures, a second example sub-module may be used for creating clusters of consumer profiles, and a third example sub-module may be used for creating clusters of vehicle profiles. However, these are merely examples of sub-modules and should not be taken as limiting.

Illustrative Methods

Figure 3:
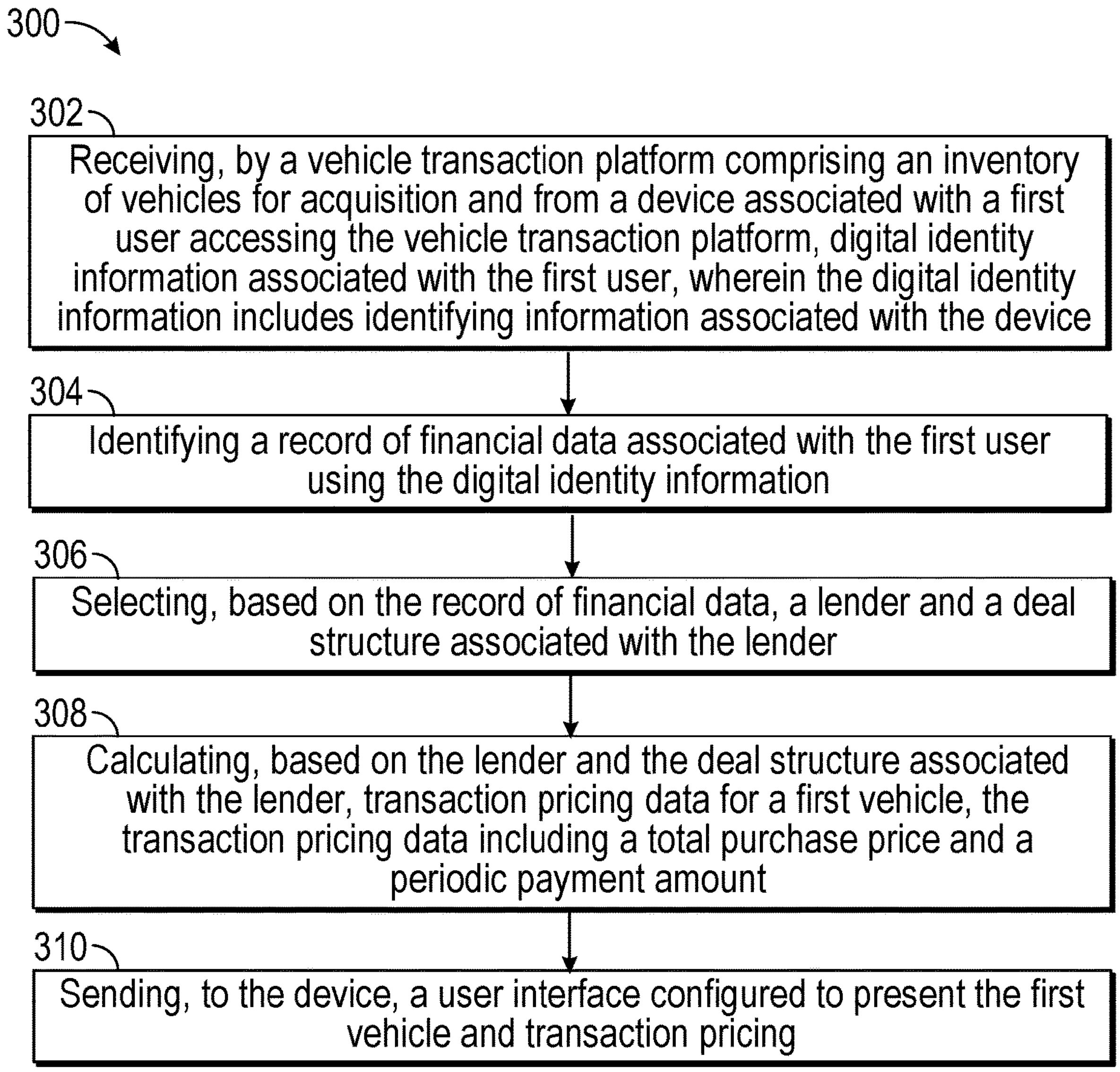
FIG. 3 depicts a flowchart of an example method, in accordance with one or more example embodiments of the disclosure.

FIG. 3 is an example method 300 for improving a vehicle transaction platform in accordance with one or more example embodiments of the disclosure. In some embodiments, example method 300 may be associated with the first facet of the improved vehicle transaction platform as described above. At block 302 of the method 300 in FIG. 3, the method may include receiving, by a vehicle transaction platform comprising an inventory of vehicles for acquisition and from a device associated with a first user accessing the vehicle transaction platform, digital identity information associated with the first user, wherein the digital identity information includes identifying information associated with the device. Such digital identity information may include information associated with a device that the consumer may use to access the vehicle transaction platform. Thus, the digital identity information may be passively-obtained information. That is, it may be information that may not be actively provided by the consumer, but may instead be obtained from some source other than the consumer (for example, the consumer's mobile device). For example, the digital identity information may include an Internet Protocol (IP) or Media Access Control (MAC) address of the device, an Internet Service Provider (ISP) associated with the device, a cell tower that the device is connected to, saved cookies associated with the device and the vehicle transaction platform, or any other digital information associated with the device. The digital identity of the consumer may also be supplemented with additional information as well. For example, given that the ISP of the device may be determined, a request may be made to the ISP for additional information about the device and/or the consumer from the ISP itself.

Block 304 of the method 300 may include identifying a record of financial data associated with the first user using the digital identity information. For example, once the digital identity of the consumer is compiled, it may be provided to a third party system that may include a database of users and information associated with such users. For example, the information associated with the user may include information such as a name of the user, an email address associated with the user, a phone number associated with the user, a social security number of the user, among other types of information pertaining to the user. For example, the third party system may be a credit reporting agency. The third party system may use the digital identity information to determine if a match exists between information associated with any of the users in the database and the digital identity information of the consumer. The determination that a match exists may also involve the use of a confidence factor or threshold that the match exists. For example, the confidence factor may determine if an exact match between the digital identity information and the information associated with any of the users in the database. If an exact match does not exist, then no indication of the consumer's identity may be provided. If a match is determined, then the third party system may provide an indication of the consumer's identity. Beyond merely providing confirmation, the third party system may also provide credit information associated with the user (for example, credit history, credit score, etc.). The third party system may also provide any other types of information about the user as well, such as open credit lines, annual income, employer information, etc. This credit information may then be used by the vehicle transaction platform to determine potential financing offers for the consumer. For example, the vehicle transaction platform may provide the credit information to one or more lending institutions to determine what potential loan amounts and interest rates the consumer may qualify for based on their credit information. The end result of this may be that the consumer may be matched to a lender rate card to determine financing structures that consumer may qualify for, all while the consumer may only be required to manually provide little to no information. It should also be noted that while the above described a third party system determining the identity of the consumer, the same processes may be performed through an internal or local system as well (for example, a dealership system or a system that hosts an online platform). That is, the system performing the identity determinations does not necessarily have to be a third party system.

Block 306 of the method 300 may include selecting, based on the record of financial data, a lender and a deal structure associated with the lender. Block 308 of the method 300 may include calculating, based on the lender and the deal structure associated with the lender, transaction pricing data for a first vehicle, the transaction pricing data including a total purchase price and a periodic payment amount. For example, once the identity of the consumer is verified, and the credit information for the consumer is determined, different vehicle loan financing structures for the consumer may be obtained from various lending institutions. For example, based on the consumer's credit information, a first lending institution may indicate that the consumer qualifies for a vehicle loan of up to $50,000 at an interest rate of 4.5% and for up to a term length of 72 months, and a second lending institution may express that the consumer qualifies for a vehicle loan of up to $80,000 at an interest rate of 3.7% and also for up to a term length of 72 months. The consumer may also automatically receive pre-approval for these financing structures. Other details regarding potential financing structures for the consumer may also be determined, such as the taxes that may apply to the purchase of a vehicle, government credits the consumer may be entitled to based on the type of vehicle (for example, a credit that may be granted to a consumer purchasing an electric vehicle), ancillary insurance options for the vehicle, among other details. This information may be determined, for example, based on a known address of the consumer by referencing the vehicle rules and regulations of the state and/or county that the consumer lives in. As described above, these financing structures may be determined for the consumer without the consumer having to fill out any forms or provide any personal information (except in circumstances when the identity of the user is not able to be determined based on their digital identity information alone). Additionally, beyond determined pre-approved financing structures for the consumer, the consumer identity verification may also allow the vehicle transaction platform to internally reduce the envelope of vehicles determined to be relevant to the consumer to a subset of the vehicle inventory. In other words, the vehicle transaction platform may include a total inventory of vehicles available for purchase by any number of consumers. Based on the verified identity of the consumer and the credit information of the consumer, the vehicle transaction platform may determine that the consumer is only financially able to purchase a particular subset of the vehicles of the total vehicle inventory. For example, if the credit information of the consumer is such that the best offer provided by a lending institution may be for $70,000, then the vehicle transaction platform may filter out any vehicles valued above $70,000. Likewise, the filtering may be performed based on a monthly payment that a consumer can afford. For example, the best offer provided by a lending institution may translate to payments of $500 per month for a term period of 48 months. In this case, the system may filter out vehicles that would cost the consumer more than $500 a month over a term period of 48 months. Thus, when the vehicle transaction platform displays a vehicle listing for the consumer to browse, only the vehicle's that the consumer can afford will be displayed. This may help to remove extraneous information that is irrelevant to the consumer and simplify their vehicle searching process. In some instances, while the total vehicle inventory may initially be reduced to the subset, the subset may also be dynamic based on inputs provided by the consumer. For example, if the consumer indicates that they are able to provide a down payment of $20,000, then the subset may increase as this down payment would allow the consumer to afford a larger subset of vehicles than if they were financing 100% of the vehicle purchase.

Block 310 of the method 300 may include sending, to the device, a user interface configured to present the first vehicle and transaction pricing.

Figure 4:
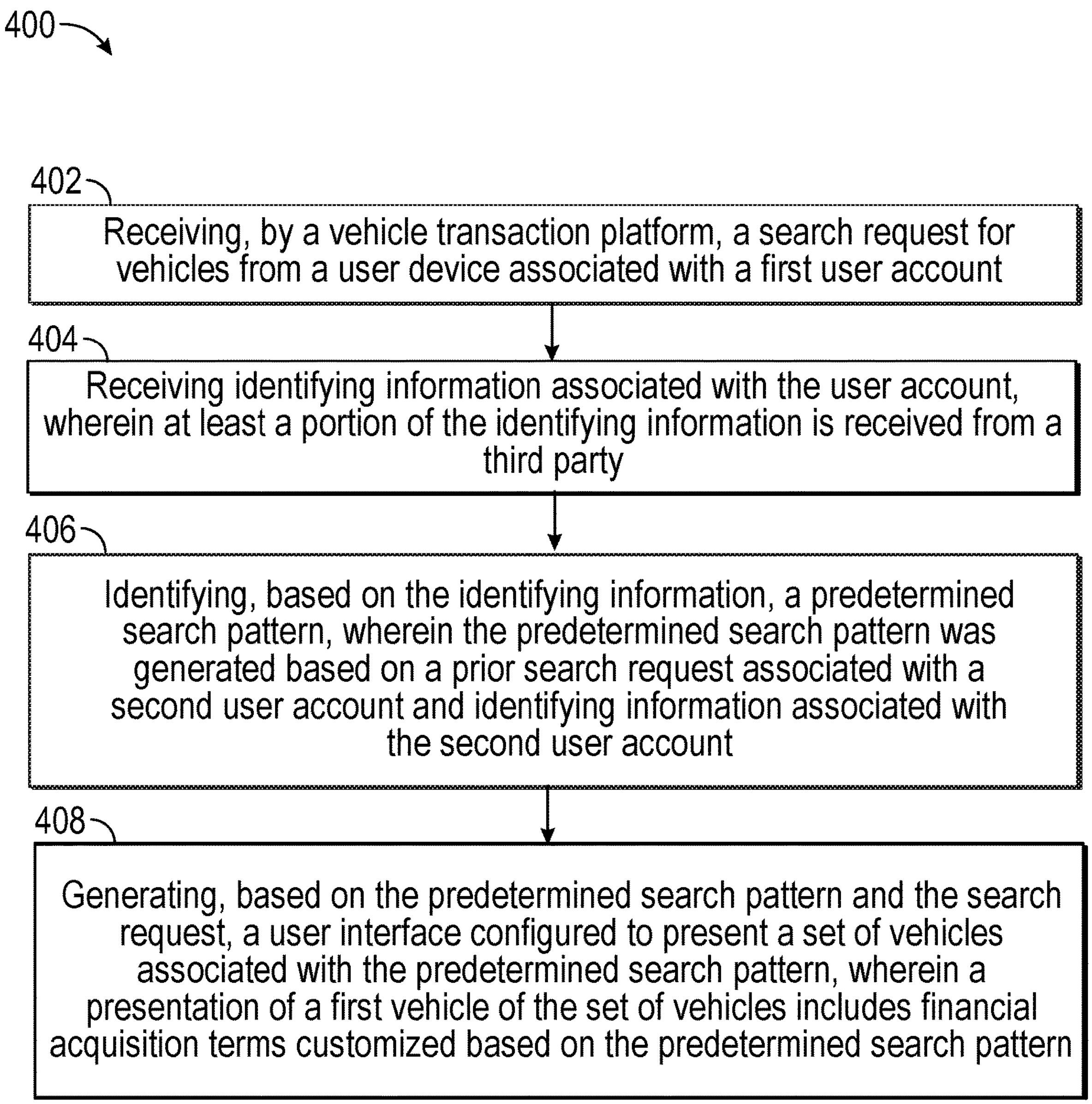
FIG. 4 depicts a flowchart of an example method, in accordance with one or more example embodiments of the disclosure.

FIG. 4 is an example method 400 for improving a vehicle transaction platform in accordance with one or more example embodiments of the disclosure. In some embodiments, example method 400 may be associated with the second facet of the improved vehicle transaction platform as described above. At block 402 of the method 400 in FIG. 4, the method may include receiving, by a vehicle transaction platform, a search request for vehicles from a user device associated with a first user account. Block 404 of the method 400 may include receiving identifying information associated with the user account, wherein at least a portion of the identifying information is received from a third party.

Block 406 of the method 400 may include identifying, based on the identifying information, a predetermined search pattern, wherein the predetermined search pattern was generated based on a prior search request associated with a second user account and identifying information associated with the second user account. In some embodiments, such search patterns may allow the vehicle transaction platform to predict the types of vehicles and types of financing structures (term length of the financing structure, interest rates, etc.), among other information, that a particular type of consumer falling within the pattern would likely be associated with. These patterns may be pre-determined using machine learning (for example, a machine learning module 209 as described with respect to FIG. 2A below or any other machine learning module and/or system described herein). Alternatively, the patterns may be determined using any other type of artificial intelligence. In determining the various patterns that may exist, the machine learning may first receive a number of data inputs. The data inputs may include, for example, consumer browsing behavior, consumer credit profiles, deal structures that consumers are creating, typical down payments, types of vehicles consumers are searching for, etc. Based on these inputs, the machine learning may establish the one or more pre-determined consumer vehicle search patterns. These pre-determined search patterns may then be stored in cache of the vehicle transaction platform for future reference (or alternatively any other type of storage either locally to the vehicle transaction platform or remotely from the vehicle transaction platform). By storing these pre-determined consumer vehicle search patterns, if a given consumer that accesses the vehicle transaction platform to perform a search for vehicles to purchase matches one of the pre-determined patterns, then the vehicle transaction platform may merely need to present a portion of the total vehicle inventory pre-determined to be associated with that consumer vehicle search pattern. For example, a pattern may involve a preference of new vehicles over used vehicles, a preference of new vehicles over certified vehicles, a preference of certified vehicles over used vehicles, a preference of foreign vehicles over domestic vehicles, a certain body style preference, a preference of vehicles in a certain price range, or any other types of consumer vehicle shopping patterns. This may eliminate or reduce the need for the vehicle transaction platform to perform real-time calculations (for example, real-time calculations to determine the exact financing information for the vehicles being presented to the consumer) for the consumer if the consumer matches one of the patterns, and may also reduce the amount of latency experienced by the consumer in receiving the listing of vehicles and associated exact payment amounts associated with each of the vehicles. This may also increase the convenience of the vehicle transaction platform for the consumer, as the consumer may then only be presented with the types of vehicle listings and deal structures that they are most likely to search for without the consumer having to provide any input information (for example, without the user having to input any search queries to the platform) to the vehicle transaction platform. In some instances, the consumer may not match one of the pre-determined patterns. In such cases, real-time calculations may need to be performed. However, the use of the patterns stored in cache serves to reduce the number of instances in which real-time calculations are performed, and consequentially reduce the computational requirements of the vehicle purchasing platform to a more feasible level.

Block 408 of the method 400 may include generating, based on the predetermined search pattern and the search request, a user interface configured to present a set of vehicles associated with the predetermined search pattern, wherein a presentation of a first vehicle of the set of vehicles includes financial acquisition terms customized based on the predetermined search pattern.

The operations described and depicted in the illustrative process flows of FIGS. 3-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3-4 may be performed.

One or more operations of the process flows of FIGS. 3-4 may have been described above as being performed by a user device, or more specifically, by one or more program modules, applications, or the like executing on a device. It should be appreciated, however, that any of the operations of process flows of FIGS. 3-4 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the process flows of FIGS. 3-4 may be described in the context of the illustrative vehicle transaction platform, it should be appreciated that such operations may be implemented in connection with numerous other device configurations.

Illustrative System Architecture

FIG. 5 is a schematic illustration of example system 500 in accordance with one or more example embodiments of the disclosure. As shown in FIG. 5, the system 500 may include at least one or more devices 510(1), . . . , 510(N), one or more vehicle transaction platform server(s) 540, and one or more third party system(s) 550.

In some embodiments, the one or more mobile devices 510(1), . . . , 510(N) may include portable or non-portable devices, each having computing resources and communication resources that permit sending, receiving, or exchanging data and/or signaling wirelessly with an external electronic device (mobile or otherwise). For instance, the mobile devices can include a mobile telephone (such as a smartphone), a tablet computer, a wearable, a laptop computer, a gaming console, an electronic reader (e-reader), a consumer electronics device having wireless communication functionality, a home appliance having wireless communication functionality, a combination thereof, or similar. The one or more vehicle transaction platform server(s) 540 may be the same as the vehicle transaction platform 104, vehicle transaction platform 206 or any other vehicle transaction platform described herein. The one or more third party system(s) 550 may be the same as third party system 108 or any other third party system described herein. For simplicity, reference may be made herein to "device 510," "server 540," and "server 550," however any other number of such elements may similarly be applicable.

In some embodiments, communications between a device 510, server 540, and/or server 550 may be performed via one or more networks 502, which may be wireless or wired networks. The one or more networks 502 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the one or more networks may have any suitable communication range associated therewith and may include, for example, global networks (e.g., the Internet), metropolitan area networks (MANs), wide area networks (WANs), local area networks (LANs), or personal area networks (PANs). In addition, the one or more networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In an illustrative configuration, the device 510 may include at least a memory 514 and one or more processing units (or processors) 512. The processors 512 may be implemented as appropriate in hardware, software, firmware, or combinations thereof. Software or firmware implementations of the processors 512 may include computer-executable or machine-executable instructions written in any suitable programming language to perform the various functions described.

The memory 514 may store program instructions that are loadable and executable on the processors 512, as well as data generated during the execution of these programs. Depending on the configuration and type of the device 510, the memory 514 may be volatile (such as random access memory (RAM)) and/or non-volatile (such as read-only memory (ROM), flash memory, etc.). The device 510 or server may also include additional removable storage 516 and/or non-removable storage 518 including, but not limited to, magnetic storage, optical disks, and/or tape storage. The disk drives and their associated computer-readable media may provide non-volatile storage of computer-readable instructions, data structures, program modules, and other data for the vehicles. In some implementations, the memory 514 may include multiple different types of memory, such as static random access memory (SRAM), dynamic random access memory (DRAM), or ROM.

The memory 514, the removable storage 516, and the non-removable storage 518 may be all examples of computer-readable storage media. For example, computer-readable storage media may include volatile and non-volatile, removable and non-removable media implemented in any method or technology for the storage of information such as computer-readable instructions, data structures, program modules, or other data. The memory 514, the removable storage 516, and the non-removable storage 518 may be all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the device 510 or other vehicles. Combinations of any of the above should also be included within the scope of computer-readable media.

Alternatively, computer-readable communication media may include computer-readable instructions, program modules, or other data transmitted within a data signal, such as a carrier wave, or other transmissions. However, as used herein, computer-readable storage media does not include computer-readable communication media.

The device 510 may also contain communication connection(s) 520 that allows the device 510 to communicate with a stored database, another vehicle or server, user terminals, and/or other devices on a network. The device 510 may also include input device(s) 522 such and output device(s) 524, such as a touch screen that is capable of receiving input commands from a user and presenting a user interface to the user.

Turning to the contents of the memory 514 in more detail, the memory 514 may include an operating system 526 and one or more application programs or services for implementing the features disclosed herein, including a vehicle transaction application 528. The vehicle transaction application may allow a user to perform certain functions using the device 510. For example, the vehicle transaction application 528 may allow a user to access the vehicle transaction platform (for example, server 540). The vehicle transaction application 528 may also be used to facilitate providing digital identity information of the device 510 to the vehicle transaction platform (for example, server 540), among other functions.

Referring now to other illustrative components depicted in FIG. 5, the server 540 may be configured to communicate with the device 510 and/or server 550 and may be configured to perform any of the operations described herein. For example, any of the operations described with respect to vehicle transaction platform 104, vehicle transaction platform 206 or any other vehicle transaction platform described herein In some embodiments, the server 540 may include some similar elements as the device 510. The server 540 may include at least a memory 558 and one or more processing units (or processors) 542. The processors 542 may be implemented as appropriate in hardware, software, firmware, or combinations thereof. Software or firmware implementations of the processors 542 may include computer-executable or machine-executable instructions written in any suitable programming language to perform the various functions described.

The memory 558 may store program instructions that are loadable and executable on the processors 542, as well as data generated during the execution of these programs. Depending on the configuration and type of the server 540, the memory 558 may be volatile (such as random access memory (RAM)) and/or non-volatile (such as read-only memory (ROM), flash memory, etc.). The server 540 or server may also include additional removable storage 548 and/or non-removable storage 552 including, but not limited to, magnetic storage, optical disks, and/or tape storage. The disk drives and their associated computer-readable media may provide non-volatile storage of computer-readable instructions, data structures, program modules, and other data for the vehicles. In some implementations, the memory 558 may include multiple different types of memory, such as static random access memory (SRAM), dynamic random access memory (DRAM), or ROM.

The memory 558, the removable storage 548, and the non-removable storage 552 may be all examples of computer-readable storage media. For example, computer-readable storage media may include volatile and non-volatile, removable and non-removable media implemented in any method or technology for the storage of information such as computer-readable instructions, data structures, program modules, or other data. The memory 558, the removable storage 548, and the non-removable storage 552 may be all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the server 540 or other vehicles. Combinations of any of the above should also be included within the scope of computer-readable media.

Alternatively, computer-readable communication media may include computer-readable instructions, program modules, or other data transmitted within a data signal, such as a carrier wave, or other transmissions. However, as used herein, computer-readable storage media does not include computer-readable communication media.

The server 540 may also contain communication connection(s) 570 that may allow the server 540 to communicate with a stored database, another vehicle or server, user terminals, and/or other devices on a network. The server 540 may also include input device(s) 544 such as a keyboard, a mouse, a pen, a voice input device, a touch input device, etc., and output device(s) 546, such as a display, speakers, printers, etc.

Turning to the contents of the memory 558 in more detail, the memory 558 may include an operating system 554 and one or more application programs or services for implementing the features disclosed herein, including a vehicle transaction module 556. In some instances, the vehicle transaction module 556 may be configured to perform operations described with respect to vehicle transaction platform 104, vehicle transaction platform 206 or any other vehicle transaction platform described herein. For example, vehicle transaction module 556 may be configured to perform the first facet and/or the second facet associated with the systems and methods as described above.

In some embodiments, The server 550 may also have similar components as the device 510 and/or the server 540, including at least one or more processors, inputs devices, output devices, removable storage, non-removable storage, communication connections, and memory, the memory including one or more operating systems. The server 550 may also specifically include an information database 552 and/or a user identification module 560. The information database 552 may be a database including a listing of users that digital identity information associated with a consumer may be compared to determine the identity of the consumer as described above. The user identification module 560 may be configured to perform any of the operations described with respect to the third party system (for example, third party system 108 or any other third-party system described herein). For example, user identification module 560 may be configured to receive digital identity information associated with a device of a consumer and may compare the digital identity information of the consumer to the information associated with the one or more users in the information database 552 to determine the user identity of the consumer associated with the digital identity information.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database task or search language, or a report writing language. In one or more example embodiments, a software component comprising instructions in one of the foregoing examples of programming languages may be executed directly by an operating system or other software components without having to be first transformed into another form.

A software component may be stored as a file or other data storage construct. Software components of a similar type or functionally related may be stored together, such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines, and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, “can,” “could,” “might,” or “may,” unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component.

Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

That which is claimed is:

1. A system comprising:
at least one processor; and
at least one memory storing computer-executable instructions, that when executed by the at least one processor, cause the at least one processor to:
determine, prior to receiving a vehicle search request via a website associated with a vehicle transaction platform comprising an inventory of vehicles for acquisition, and using a machine learning model, wherein the machine learning model is trained on historical consumer browsing behavior, consumer credit profiles, and deal structures to generate clustered consumer profiles, a plurality of consumer search patterns based on one or more prior searches performed by a plurality of consumers through the website of the vehicle transaction platform, wherein, the inventory of vehicles includes at least 5,000vehicles with at least 1,000 down payment options, at least 350 net trade-in options, at least five payment term options, and at least 50,000 tax locations, and wherein an amount of time required to calculate, by the vehicle transaction platform, all possible transaction pricing data permutations for vehicles in the inventory of vehicles would render the website of the vehicle transaction platform unusable as the vehicle transaction platform would be unable to perform the calculations to update a user interface website in real-time with the transaction pricing data for each of the vehicles in the inventory of vehicles;
determine, via the machine learning model, a first subset of vehicles of the inventory of vehicles and one or more deal structures associated with a first consumer search pattern of the plurality of consumer search patterns;
send the one or more deal structures to one or more lenders;
receive, from the one or more lenders and based on the one or more deal structures, transaction pricing data for the first subset of vehicles, the transaction pricing data including total purchase prices and periodic payment amounts for the first subset of vehicles;
store the plurality of consumer search patterns in cache, wherein the transaction pricing data is stored in the cache in association with the first consumer search pattern;
receive, subsequent to storing the plurality of consumer search patterns in cache, the vehicle search request via the website, wherein the vehicle search request is performed using a first user account associated with a user;
receive, by the vehicle transaction platform and from a device associated with the first user account accessing the vehicle transaction platform, digital identity information associated with the first user account, wherein the digital identity information includes identifying information associated with the device;
determine, via the machine learning model, that the first user account aligns with the first consumer search pattern stored in cache based at least in part on the digital identity information associated with the device;
obtain, based on determining that the first user account is associated with the first consumer search pattern, the transaction pricing data associated with the first consumer search pattern from the cache without having to re-calculate, by the vehicle transaction platform, the transaction pricing data and without requiring real-time API calls to the one or more lenders as the user associated with the first user account browses the website associated with the vehicle transaction platform; and
cause to present, in real-time, via the device, using the transaction pricing data stored in the cache instead of re-calculating the transaction pricing data in real-time, and based on the determination that the first user account is aligned with the first consumer search pattern, a user interface of the website of the vehicle transaction platform including the first subset of vehicles and transaction pricing data received from the cache, such that the first subset of the vehicles and the transaction pricing are presented to the user in real-time via the user interface of the website as the user browses the website without causing latency that would prevent the user interface of the website from being presented in real-time, thereby reducing computational load on the vehicle transaction platform and eliminating latency caused by real-time calculations.

2. The system of claim 1, wherein the computer-executable instructions further cause the at least one processor to:
receive, by the vehicle transaction platform and from a second device associated with a second user account, second digital identity information associated with the second user account, wherein the second digital identity information includes identifying information associated with the second device;
compare the second digital identity information associated with the second user account to information associated with one or more user identities;
determine, based on the comparison between the second digital identity information associated with the second user account to the information associated with one or more user identities, that a confidence value of a degree of match between the information associated with the one or more user identities and the second digital identity information associated with the second user account is below a threshold value;

receive, based on the determination that the confidence value is below the threshold value, supplemental information from the second user account;

compare, the second digital identity information associated with the second user account and the supplemental information to information associated with the one or more user identities;

determine, based on the comparison between the second digital identity information associated with the second user account and the supplemental information to the information associated with the one or more user identities, that the second user account is associated with a second user identity of the one or more user identities;

identify, based on the determination that the second user account is associated with the second user identity, a credit history of a second user associated with the second user identity; and determine, based on the credit history of the second user, a first subset of the inventory of vehicles for the second user account.

3. The system of claim 2, wherein the computer-executable instructions further cause the at least one processor to:

receive, from the device, an indication of one or more user inputs of a vehicle type or a vehicle financing structure; and determine, based on the indication, a second subset of the inventory of vehicles.

4. The system of claim 3, wherein the one or more user inputs include information regarding a vehicle down payment of a first user associated with the first user account, and wherein the second subset of the inventory of vehicles includes more vehicles than the first subset of the inventory of vehicles.

5. The system of claim 1, wherein the computer-executable instructions further cause the at least one processor to:

determine, based on the digital identity information associated with the device of the first user account, an Internet Service Provider (ISP) of the device of the first user;

request supplemental information regarding the first user account from the ISP; and add information received in response to the request to the digital identity information associated with the device of the first user account.

6. The system of claim 1, wherein the identifying information associated with the device includes at least one of: an Internet Protocol (IP) address, a telephone number, a Media Access Control (MAC) address, an Internet Service Provider (ISP), or a cellular tower being accessed by the device.

7. A method, comprising:

determining, via a machine learning model, wherein the machine learning model is trained on historical consumer browsing behavior, consumer credit profiles, and deal structures to generate clustered consumer profiles, and associated with a vehicle transaction platform comprising an inventory of vehicles for acquisition, a plurality of consumer search patterns based on one or more prior searches performed by a plurality of consumers through a website of the vehicle transaction platform, wherein, the inventory of vehicles includes at least 5,000 vehicles with at least 1,000down payment options, at least 350 net trade-in options, at least five payment term options, and at least 50,000 tax locations, and wherein an amount of time required to calculate, by the vehicle transaction platform, all possible transaction pricing data permutations for vehicles in the inventory of vehicles would render the website of the vehicle transaction platform unusable as the vehicle transaction platform would be unable to perform the calculations to update a user interface website in real-time with the transaction pricing data for each of the vehicles in the inventory of vehicles;

determining, prior to receiving a vehicle search request and via the machine learning model, a first subset of vehicles of the inventory of vehicles and one or more deal structures associated with a first consumer search pattern of the plurality of consumer search patterns;

sending the one or more deal structures to one or more lenders;

receiving, from the one or more lenders and based on the one or more deal structures, transaction pricing data for the first subset of vehicles, the transaction pricing data including total purchase prices and periodic payment amounts for the first subset of vehicles;

storing the plurality of consumer search patterns in cache, wherein the transaction pricing data is stored in the cache in association with the first consumer search pattern;

receiving, subsequent to storing the plurality of consumer search patterns in cache, the vehicle search request via the website, wherein the vehicle search request is performed using a first user account associated with a user;

receiving, by the vehicle transaction platform and from a device associated with a first user account accessing the vehicle transaction platform, digital identity information associated with the first user account, wherein the digital identity information includes identifying information associated with the device;

determining, via the machine learning model, that the first user account is associated with the first consumer search pattern stored in the cache based at least in part on the digital identity information associated with the device;

obtaining, based on determining that the first user account is associated with the first consumer search pattern, the transaction pricing data associated with the first consumer search pattern from the cache without having to re-calculate, by the vehicle transaction platform, the transaction pricing data and without requiring real-time API calls to the one or more lenders as the user associated with the first user account browses the website associated with the vehicle transaction platform; and causing to present, in real-time, via the device, using the transaction pricing data stored in the cache instead of re-calculating the transaction pricing data in real-time, and based on the determination that the first user account is aligned with the first consumer search pattern, a user interface of the website of the vehicle transaction platform including the first subset of vehicles and transaction pricing data received from the cache, such that the first subset of the vehicles and the transaction pricing are presented to the user in real-time via the user interface of the website as the user browses the website without causing latency that would prevent the user interface of the website from being presented in real-time, thereby reducing computational load on the vehicle transaction platform and eliminating latency caused by real-time calculations.

8. The method of claim 7, further comprising:

receiving, by the vehicle transaction platform and from a second device associated with a second user account, second digital identity information associated with the second user account, wherein the second digital identity information includes identifying information associated with the second device;

comparing the second digital identity information associated with the second user account to information associated with one or more user identities;

determining, based on the comparison between the second digital identity information associated with the second user account to the information associated with one or more user identities, that a confidence value of a degree of match between the information associated with the one or more user identities and the second digital identity information associated with the second user account is below a threshold value;

receiving, based on the determination that the confidence value is below the threshold value, supplemental information from the second user account;

comparing, the second digital identity information associated with the second user account and the supplemental information to information associated with the one or more user identities;

determining, based on the comparison between the second digital identity information associated with the second user account and the supplemental information to the information associated with the one or more user identities, that the second user account is associated with a second user identity of the one or more user identities;

identifying, based on the determination that the second user is associated with the second user identity, a credit history of a second user associated with the second user identity; and determining, based on the credit history of the second user, a first subset of the inventory of vehicles for the second user account.

9. The method of claim 8, further comprising:

generating the user interface comprising a listing of vehicles included within the first subset of the inventory of vehicles.

10. The method of claim 9, further comprising:

receiving, from the device, an indication of one or more user inputs of a vehicle type or a vehicle financing structure; and determining, based on the indication, a second subset of the inventory of vehicles.

11. The method of claim 10, wherein the one or more user inputs include information regarding a vehicle down payment of a first user associated with the first user account, and wherein the second subset of the inventory of vehicles includes more vehicles than the first subset of the inventory of vehicles.

12. The method of claim 7, further comprising:

determining, based on the digital identity information associated with the device of the first user account, an Internet Service Provider (ISP) of the device of the first user account;

requesting supplemental information regarding the first user account from the ISP; and adding information received in response to the request to the digital identity information associated with the device of the first user account.

13. The method of claim 7, wherein the identifying information associated with the device includes at least one of: an Internet Protocol (IP) address, a telephone number, a Media Access Control (MAC) address, an Internet Service Provider (ISP), or a cellular tower being accessed by the device.

14. A non-transitory computer readable medium including computer-executable instructions stored thereon, which when executed by one or more processors, cause the one or more processors to perform operations of:

determining, prior to receiving a vehicle search request via a website associated with a vehicle transaction platform comprising an inventory of vehicles for acquisition, and via a machine learning model, wherein the machine learning model is trained on historical consumer browsing behavior, consumer credit profiles, and deal structures to generate clustered consumer profiles, a plurality of consumer search patterns based on one or more prior searches performed by a plurality of consumers through the website of the vehicle transaction platform, wherein, the inventory of vehicles includes at least 5,000 vehicles with at least 1,000 down payment options, at least 350 net trade-in options, at least five payment term options, and at least 50,000 tax locations, and wherein an amount of time required to calculate, by the vehicle transaction platform, all possible transaction pricing data permutations for vehicles in the inventory of vehicles would render the website of the vehicle transaction platform unusable as the vehicle transaction platform would be unable to perform the calculations to update a user interface website in real-time with the transaction pricing data for each of the vehicles in the inventory of vehicles;

determining, via the machine learning model, a first subset of vehicles of the inventory of vehicles and one or more deal structures associated with a first consumer search pattern of the plurality of consumer search patterns;

sending the one or more deal structures to one or more lenders;

receiving, from the one or more lenders and based on the one or more deal structures, transaction pricing data for the first subset of vehicles, the transaction pricing data including total purchase prices and periodic payment amounts for the first subset of vehicles;

storing the plurality of vehicle consumer search patterns in cache, wherein the transaction pricing data is stored in the cache in association with the first consumer search pattern;

receiving, subsequent to storing the plurality of consumer search patterns in cache, the vehicle search request via the website, wherein the vehicle search request is performed using a first user account associated with a user;

receiving, by the vehicle transaction platform and from a device associated with a first user account accessing the vehicle transaction platform, digital identity information associated with the first user account, wherein the digital identity information includes identifying information associated with the device;

determining, via the machine learning model and at a first time, that the first user account aligns with the first consumer search pattern stored in the cache based at least in part on the digital identity information associated with the device;

obtaining, based on determining that the first user account is associated with the first consumer search pattern, the transaction pricing data associated with the first consumer search pattern from the cache without having to re-calculate, by the vehicle transaction platform, the transaction pricing data and without requiring real-time API calls to the one or more lenders as the user associated with the first user account browses the website associated with the vehicle transaction platform; and causing to present, via the device, at the first time and in sequence with the determination that the first user account is aligned with the first consumer search pattern, a user interface of the website of the vehicle transaction platform including the first subset of vehicles and transaction pricing data received from the cache, without real-time calculation being performed to determine the transaction pricing data, such that the first subset of the vehicles and the transaction pricing are presented to the user in real-time via the user interface of the website as the user browses the website without causing latency that would prevent the user interface of the website from being presented in real-time, thereby reducing computational load on the vehicle transaction platform and eliminating latency caused by real-time calculations.

15. The non-transitory computer readable medium of claim 14, wherein the computer-executable instructions further cause the one or more processors to perform operations of:

receiving, by the vehicle transaction platform and from a second device associated with a second user account, second digital identity information associated with the second user account, wherein the second digital identity information includes identifying information associated with the second device;

comparing the second digital identity information associated with the second user account to information associated with one or more user identities;

determining, based on the comparison between the second digital identity information associated with the second user account to the information associated with one or more user identities, that a confidence value of a degree of match between the information associated with the one or more user identities and the second digital identity information associated with the second user account is below a threshold value;

receiving, based on the determination that the confidence value is below the threshold value, supplemental information from the second user account;

comparing, the second digital identity information associated with the second user account and the supplemental information to information associated with the one or more user identities;

determining, based on the comparison between the second digital identity information associated with the second user account and the supplemental information to the information associated with the one or more user identities, that the second user account is associated with a second user identity of the one or more user identities;

identifying, based on the determination that the second user account is associated with the second user identity, a credit history of a second user associated with the second user identity; and determining, based on the credit history of the second user, a first subset of the inventory of vehicles for the second user.

16. The non-transitory computer readable medium of claim 15, wherein the computer-executable instructions further cause the one or more processors to perform operations of:

generating the user interface comprising a listing of vehicles included within the first subset of the inventory of vehicles.

17. The non-transitory computer readable medium of claim 15, wherein the computer-executable instructions further cause the one or more processors to perform operations of:

receiving, from the device, an indication of one or more user inputs of a vehicle type or a vehicle financing structure; and determining, based on the indication, a second subset of the inventory of vehicles.

18. The non-transitory computer readable medium of claim 17, wherein the one or more user inputs include information regarding a vehicle down payment of a first user associated with the first user account, and wherein the second subset of the inventory of vehicles includes more vehicles than the first subset of the inventory of vehicles.

19. The non-transitory computer readable medium of claim 14, wherein the computer-executable instructions further cause the one or more processors to perform operations of:

determining, based on the digital identity information associated with the device of the first user account, an Internet Service Provider (ISP) of the device of the first user account;

requesting supplemental information regarding the first user account from the ISP; and adding information received in response to the request to the digital identity information associated with the device of the first user account.

20. The system of claim 1, wherein the computer-executable instructions further cause the at least one processor to:

receive, from the device associated with the first user account, a search associated with the vehicle transaction platform; and dynamically update, using the machine learning model and based on the search, the plurality of consumer search patterns.

21. The system of claim 1, wherein the computer-executable instructions further cause the at least one processor to:

receive, by the vehicle transaction platform, an input including a modification to a vehicle search request;

dynamically update, in real-time and based on the input, the transaction pricing data to produce updated transaction pricing data; and present, in real-time and via the user interface, the transaction pricing data.

* * * * *